United States Patent
Miller et al.

(10) Patent No.: US 10,609,677 B2
(45) Date of Patent: *Mar. 31, 2020

(54) SITUATIONALLY-AWARE ALERTS

(71) Applicant: Apple Inc., Cupertino, CA (US)

(72) Inventors: Thayne M. Miller, San Jose, CA (US); Hung A. Pham, Oakland, CA (US); John B. Morrell, Los Gatos, CA (US); Brian T. Gleeson, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,645

(22) Filed: Jan. 28, 2019

(65) Prior Publication Data

US 2019/0159170 A1 May 23, 2019

Related U.S. Application Data

(60) Division of application No. 16/015,367, filed on Jun. 22, 2018, now abandoned, which is a continuation of
(Continued)

(51) Int. Cl.
*H04W 68/02* (2009.01)
*H04M 1/725* (2006.01)
(Continued)

(52) U.S. Cl.
CPC ............. *H04W 68/02* (2013.01); *G08B 6/00* (2013.01); *H04M 1/72569* (2013.01); *H04M 19/047* (2013.01); *H04M 2250/12* (2013.01)

(58) Field of Classification Search
CPC .......... G08B 3/10; G08B 3/1025; G08B 6/00; G08B 23/00; G08B 25/01; H04W 68/00;
(Continued)

(56) References Cited

U.S. PATENT DOCUMENTS 3,001,049 A 9/1961 Didier
3,390,287 A 6/1968 Sonderegger
(Continued)

FOREIGN PATENT DOCUMENTS

AU 2015100710 7/2015
AU 2016100399 5/2016
(Continued)

OTHER PUBLICATIONS

U.S. Appl. No. 16/352,784, filed Mar. 13, 2019, Moussette et al.
(Continued)

*Primary Examiner* — Hung T Nguyen
(74) *Attorney, Agent, or Firm* — Brownstein Hyatt Farber Schreck, LLP

(57) ABSTRACT

An electronic device that provides situationally-aware alerts determines to provide an alert output (such as haptic, audio, visual, and so on) via an output device, determines a movement pattern based on one or more signals from one or more sensors indicating information relating at least to movement of the electronic device, and adjusts the alert output to account for the movement pattern. In some implementations, the electronic device may adjust the alert output by delaying the alert output. In other implementations, the electronic device may adjust the alert output by altering the alert output to be discernible despite the movement pattern based on a cadence of the movement pattern. In still other implementations, the electronic device may determine to provide the alert output in response to receiving an incoming communication and may adjust the alert output differently based on a priority associated with the incoming communication.

20 Claims, 7 Drawing Sheets

Related U.S. Application Data application No. 15/641,192, filed on Jul. 3, 2017, now abandoned, which is a continuation of application No. 15/251,459, filed on Aug. 30, 2016, now Pat. No. 10,039,080.

(60) Provisional application No. 62/303,964, filed on Mar. 4, 2016.

(51) Int. Cl.
*H04M 19/04* (2006.01)
*G08B 6/00* (2006.01)

(58) Field of Classification Search
CPC . H04W 68/02; H04W 68/005; H04M 19/042; H04M 19/044; H04M 19/047; H04M 19/04; H04M 1/72569
USPC .......... 340/407.1, 407.2, 539.11, 384.7; 345/173; 455/450.1, 570
See application file for complete search history.

(56) References Cited

U.S. PATENT DOCUMENTS

| | | |
|---|---|---|
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,490,815 A | 12/1984 | Umehara et al. |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,035,257 A | 3/2000 | Epperson |
| 6,069,433 A | 5/2000 | Lazarus et al. |
| 6,078,308 A | 6/2000 | Rosenberg et al. |
| 6,104,947 A | 8/2000 | Heikkila et al. |
| 6,127,756 A | 10/2000 | Iwaki |
| 6,135,886 A | 10/2000 | Armstrong |
| 6,198,206 B1 | 3/2001 | Saarmaa |
| 6,218,966 B1 | 4/2001 | Goodwin |
| 6,219,033 B1 | 4/2001 | Rosenberg |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,437,485 B1 | 8/2002 | Johansson |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,747,400 B2 | 6/2004 | Maichl et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,965,189 B2 | 11/2005 | Menzel |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,158,122 B2 | 1/2007 | Roberts |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,205,978 B2 | 4/2007 | Poupyrev |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 | 3/2008 | Dawson |
| 7,382,357 B2 | 6/2008 | Panotopoulos et al. |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,649,305 B2 | 1/2010 | Priya et al. |

(56) References Cited

U.S. PATENT DOCUMENTS

| | | |
|---|---|---|
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,018,105 B2 | 9/2011 | Erixon et al. |
| 8,031,172 B2 | 10/2011 | Kruse et al. |
| 8,044,940 B2 | 10/2011 | Narusawa |
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,344 B2 | 5/2012 | Yakima et al. |
| 8,174,372 B2 | 5/2012 | da Costa |
| 8,179,027 B2 | 5/2012 | Barta et al. |
| 8,179,202 B2 | 5/2012 | Cruz-Hernandez et al. |
| 8,188,623 B2 | 5/2012 | Park |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,339,250 B2 | 12/2012 | Je et al. |
| 8,344,834 B2 | 1/2013 | Niiyama |
| 8,345,013 B2 | 1/2013 | Heubel et al. |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,388,346 B2 | 3/2013 | Rantala et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,405,618 B2 | 3/2013 | Colgate et al. |
| 8,411,058 B2 | 4/2013 | Wong et al. |
| 8,446,264 B2 | 5/2013 | Tanase |
| 8,451,255 B2 | 5/2013 | Weber et al. |
| 8,452,345 B2 | 5/2013 | Lee et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,593,409 B1 | 11/2013 | Heubel |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Burrough et al. |
| 8,710,966 B2 | 4/2014 | Hill |
| 8,717,309 B2 | 5/2014 | Almalki |
| 8,723,813 B2 | 5/2014 | Park et al. |
| 8,733,540 B2 | 5/2014 | Woiler et al. |
| 8,735,755 B2 | 5/2014 | Peterson et al. |
| 8,760,273 B2 | 6/2014 | Casparian et al. |
| 8,760,413 B2 | 6/2014 | Peterson et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,816,981 B2 | 8/2014 | Kai et al. |
| 8,836,502 B2 | 9/2014 | Culbert et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,666 B2 | 11/2014 | Parker et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,219,401 B2 | 12/2015 | Kim et al. |
| 9,235,267 B2 | 1/2016 | Burrough et al. |
| 9,274,601 B2 | 3/2016 | Faubert et al. |
| 9,274,602 B2 | 3/2016 | Garg et al. |

(56) References Cited

U.S. PATENT DOCUMENTS

| | | |
|---|---|---|
| 9,274,603 B2 | 3/2016 | Modarres et al. |
| 9,275,815 B2 | 3/2016 | Hoffmann |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,330,544 B2 | 5/2016 | Levesque et al. |
| 9,357,052 B2 | 5/2016 | Ullrich |
| 9,360,944 B2 | 6/2016 | Pinault |
| 9,367,238 B2 | 6/2016 | Tanada |
| 9,380,145 B2 | 6/2016 | Tartz et al. |
| 9,390,599 B2 | 7/2016 | Weinberg |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |
| 9,430,042 B2 | 8/2016 | Levin |
| 9,448,628 B2 | 9/2016 | Tan et al. |
| 9,448,713 B2 | 9/2016 | Cruz-Hernandez et al. |
| 9,449,476 B2 | 9/2016 | Lynn |
| 9,452,268 B2 | 9/2016 | Badaye et al. |
| 9,454,239 B2 | 9/2016 | Elias et al. |
| 9,467,033 B2 | 10/2016 | Jun et al. |
| 9,468,846 B2 | 10/2016 | Terrell et al. |
| 9,471,172 B2 | 10/2016 | Sirois |
| 9,477,342 B2 | 10/2016 | Daverman et al. |
| 9,480,947 B2 | 11/2016 | Jiang et al. |
| 9,501,912 B1 | 11/2016 | Hayskjold et al. |
| 9,542,028 B2 | 1/2017 | Filiz et al. |
| 9,544,694 B2 | 1/2017 | Abe et al. |
| 9,564,029 B2 | 2/2017 | Morrell et al. |
| 9,576,445 B2 | 2/2017 | Cruz-Hernandez |
| 9,595,659 B2 | 3/2017 | Kim |
| 9,600,070 B2 | 3/2017 | Chatterjee et al. |
| 9,608,506 B2 | 3/2017 | Degner et al. |
| 9,622,214 B2 | 4/2017 | Ryu |
| 9,640,048 B2 | 5/2017 | Hill |
| 9,652,040 B2 | 5/2017 | Martinez et al. |
| 9,659,482 B2 | 5/2017 | Yang et al. |
| 9,665,198 B2 | 5/2017 | Kies et al. |
| 9,692,286 B2 | 6/2017 | Endo et al. |
| 9,594,450 B2 | 7/2017 | Lynn et al. |
| 9,696,803 B2 | 7/2017 | Curz-Hernandez et al. |
| 9,727,157 B2 | 8/2017 | Ham et al. |
| 9,733,704 B2 | 8/2017 | Cruz-Hernandez et al. |
| 9,746,945 B2 | 8/2017 | Sheynblat et al. |
| 9,778,743 B2 | 10/2017 | Grant et al. |
| 9,779,592 B1 | 10/2017 | Hoen |
| 9,785,251 B2 | 10/2017 | Martisauskas |
| 9,823,833 B2 | 11/2017 | Grant et al. |
| 9,830,782 B2 | 11/2017 | Morrell et al. |
| 9,831,871 B2 | 11/2017 | Lee et al. |
| 9,836,123 B2 | 12/2017 | Gipson et al. |
| 9,846,484 B2 | 12/2017 | Shah |
| 9,857,872 B2 | 1/2018 | Terlizzi et al. |
| 9,870,053 B2 | 1/2018 | Modarres et al. |
| 9,886,093 B2 | 2/2018 | Moussette et al. |
| 9,891,708 B2 | 2/2018 | Cruz-Hernandez et al. |
| 9,904,393 B2 | 2/2018 | Frey et al. |
| 9,911,553 B2 | 3/2018 | Bernstein |
| 9,928,950 B2 | 3/2018 | Lubinski et al. |
| 9,934,661 B2 | 4/2018 | Hill |
| 9,970,757 B2 | 5/2018 | Das et al. |
| 9,990,099 B2 | 6/2018 | Ham et al. |
| 9,997,306 B2 | 6/2018 | Bernstein |
| 10,013,058 B2 | 7/2018 | Puskarich et al. |
| 10,032,550 B1 | 7/2018 | Zhang |
| 10,038,361 B2 | 7/2018 | Hajati et al. |
| 10,039,080 B2 | 7/2018 | Miller et al. |
| 10,061,386 B2 | 8/2018 | Frescas et al. |
| 10,062,832 B2 | 8/2018 | Caraveo et al. |
| 10,067,585 B2 | 9/2018 | Kim |
| 10,069,392 B2 | 9/2018 | Degner et al. |
| 10,108,151 B2 | 10/2018 | Cardinali et al. |
| 10,120,446 B2 | 11/2018 | Pance et al. |
| 10,126,817 B2 | 11/2018 | Morrell et al. |
| 10,127,778 B2 | 11/2018 | Hajati et al. |
| 10,133,352 B2 | 11/2018 | Lee et al. |
| 10,139,907 B2 | 11/2018 | Billington |
| 10,139,959 B2 | 11/2018 | Butler et al. |
| 10,152,116 B2 | 12/2018 | Wang et al. |
| 10,198,097 B2 | 2/2019 | Lynn et al. |
| 10,204,494 B2 | 2/2019 | Do et al. |
| 10,236,760 B2 | 3/2019 | Moussette et al. |
| 10,338,682 B2 | 7/2019 | Heubel et al. |
| 10,345,905 B2 | 7/2019 | McClure et al. |
| 10,444,834 B2 | 10/2019 | Vescovi |
| 10,444,841 B2 | 10/2019 | Nakamura et al. |
| 2002/0194284 A1 | 12/2002 | Haynes |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1* | 1/2006 | DelGiorno ............... H04M 9/04 |
| | | 455/567 |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0032270 A1 | 2/2007 | Orr |
| 2007/0043725 A1 | 2/2007 | Hotelling et al. |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0015560 A1 | 1/2009 | Robinson et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167508 A1* | 7/2009 | Fadell ..................... G06F 3/016 |
| | | 340/407.2 |
| 2009/0167702 A1 | 7/2009 | Nurmi |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0291670 A1 | 11/2009 | Sennett et al. |
| 2010/0020036 A1 | 1/2010 | Hui et al. |
| 2010/0053087 A1 | 3/2010 | Dai et al. |
| 2010/0079264 A1 | 4/2010 | Hoellwarth |
| 2010/0089735 A1 | 4/2010 | Takeda et al. |
| 2010/0110018 A1 | 5/2010 | Faubert et al. |
| 2010/0141408 A1 | 6/2010 | Doy et al. |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0231508 A1 | 9/2010 | Cruz-Hernandez et al. |
| 2010/0265197 A1 | 10/2010 | Purdy |
| 2010/0328229 A1 | 12/2010 | Weber et al. |

(56) References Cited

U.S. PATENT DOCUMENTS

| | | |
|---|---|---|
| 2011/0007023 A1 | 1/2011 | Abrahamsson et al. |
| 2011/0053577 A1 | 3/2011 | Lee et al. |
| 2011/0075835 A1* | 3/2011 | Hill .................. H04M 1/72563 379/418 |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0156539 A1 | 6/2011 | Park et al. |
| 2011/0157052 A1 | 6/2011 | Lee et al. |
| 2011/0163985 A1 | 7/2011 | Bae et al. |
| 2011/0216013 A1 | 9/2011 | Siotis |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0075198 A1 | 3/2012 | Sulem et al. |
| 2012/0092263 A1 | 4/2012 | Peterson et al. |
| 2012/0126959 A1 | 5/2012 | Zarrabi et al. |
| 2012/0133494 A1 | 5/2012 | Cruz-Hernandez et al. |
| 2012/0139844 A1 | 6/2012 | Ramstein et al. |
| 2012/0206248 A1 | 8/2012 | Biggs |
| 2012/0256848 A1 | 10/2012 | Madabusi Srinivasan |
| 2012/0274578 A1 | 11/2012 | Snow et al. |
| 2012/0280927 A1 | 11/2012 | Ludwig |
| 2012/0319987 A1 | 12/2012 | Woo |
| 2012/0327006 A1 | 12/2012 | Israr et al. |
| 2013/0027345 A1 | 1/2013 | Binzel |
| 2013/0033967 A1 | 2/2013 | Chuang et al. |
| 2013/0043987 A1* | 2/2013 | Kasama ............ H04M 1/72569 340/407.1 |
| 2013/0058816 A1 | 3/2013 | Kim |
| 2013/0106699 A1 | 5/2013 | Babatunde |
| 2013/0191741 A1 | 7/2013 | Dickinson et al. |
| 2013/0207793 A1 | 8/2013 | Weaber et al. |
| 2013/0217491 A1 | 8/2013 | Hilbert et al. |
| 2013/0228023 A1 | 9/2013 | Drasnin et al. |
| 2013/0261811 A1 | 10/2013 | Yagi et al. |
| 2013/0300590 A1 | 11/2013 | Dietz et al. |
| 2014/0082490 A1 | 3/2014 | Jung et al. |
| 2014/0085065 A1 | 3/2014 | Biggs et al. |
| 2014/0143785 A1 | 5/2014 | Mistry et al. |
| 2014/0168153 A1 | 6/2014 | Deichmann et al. |
| 2014/0197936 A1 | 7/2014 | Biggs et al. |
| 2014/0232534 A1 | 8/2014 | Birnbaum et al. |
| 2014/0266644 A1* | 9/2014 | Heubel .................. G06F 3/0421 340/407.1 |
| 2014/0267076 A1 | 9/2014 | Birnbaum et al. |
| 2015/0005039 A1 | 1/2015 | Liu et al. |
| 2015/0040005 A1 | 2/2015 | Faaborg |
| 2015/0098309 A1 | 4/2015 | Adams et al. |
| 2015/0169059 A1 | 6/2015 | Behles et al. |
| 2015/0194165 A1 | 7/2015 | Faaborg et al. |
| 2015/0205355 A1 | 7/2015 | Yairi |
| 2015/0205417 A1 | 7/2015 | Yairi et al. |
| 2015/0296480 A1 | 10/2015 | Kinsey et al. |
| 2015/0365540 A1* | 12/2015 | Davis .................. H04M 19/042 455/567 |
| 2016/0103544 A1 | 4/2016 | Filiz et al. |
| 2016/0206921 A1 | 7/2016 | Szabados et al. |
| 2016/0216766 A1 | 7/2016 | Puskarich |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2016/0371942 A1 | 12/2016 | Smith, IV et al. |
| 2017/0038905 A1 | 2/2017 | Bijamov et al. |
| 2017/0070131 A1 | 3/2017 | Degner et al. |
| 2017/0090667 A1 | 3/2017 | Abdollahian et al. |
| 2017/0153703 A1 | 6/2017 | Yun et al. |
| 2017/0192508 A1 | 7/2017 | Lim et al. |
| 2017/0242541 A1 | 8/2017 | Iuchi et al. |
| 2017/0255295 A1 | 9/2017 | Tanemura et al. |
| 2017/0285747 A1 | 10/2017 | Chen |
| 2017/0311282 A1 | 10/2017 | Miller et al. |
| 2017/0315618 A1 | 11/2017 | Ullrich et al. |
| 2017/0345992 A1 | 11/2017 | Noguchi |
| 2017/0357325 A1 | 12/2017 | Yang et al. |
| 2017/0364158 A1 | 12/2017 | Wen et al. |
| 2018/0052550 A1 | 2/2018 | Zhang et al. |
| 2018/0059793 A1 | 3/2018 | Hajati |
| 2018/0060941 A1 | 3/2018 | Yang et al. |
| 2018/0075715 A1 | 3/2018 | Morrell et al. |
| 2018/0081441 A1 | 3/2018 | Pedder et al. |
| 2018/0174409 A1 | 6/2018 | Hill |
| 2018/0203513 A1 | 7/2018 | Rihn |
| 2018/0302881 A1 | 10/2018 | Miller et al. |
| 2019/0027674 A1 | 1/2019 | Zhang et al. |
| 2019/0214895 A1 | 7/2019 | Moussette et al. |
| 2019/0250713 A1 | 8/2019 | Chen |
| 2020/0026359 A1 | 1/2020 | Uttermann et al. |
| 2020/0027320 A1 | 1/2020 | Hill |

FOREIGN PATENT DOCUMENTS

| | | |
|---|---|---|
| CA | 2355434 | 2/2002 |
| CN | 1324030 | 11/2001 |
| CN | 1692371 | 11/2005 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 102057656 | 5/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102754054 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |
| CN | 103155410 | 6/2013 |
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103567135 | 2/2014 |
| CN | 103970339 | 8/2014 |
| CN | 104049746 | 9/2014 |
| CN | 104220963 | 12/2014 |
| CN | 104917885 | 9/2015 |
| CN | 104956244 | 9/2015 |
| CN | 105556268 | 5/2016 |
| CN | 208013890 | 10/2018 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2207080 | 7/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |

(56) References Cited

FOREIGN PATENT DOCUMENTS

| JP | 200362525 | 3/2003 |
|---|---|---|
| JP | 2003527046 | 9/2003 |
| JP | 200494389 | 3/2004 |
| JP | 2004236202 | 8/2004 |
| JP | 2006150865 | 6/2006 |
| JP | 3831410 | 10/2006 |
| JP | 2007519099 | 7/2007 |
| JP | 200818928 | 1/2008 |
| JP | 2010536040 | 11/2010 |
| JP | 2010272903 | 12/2010 |
| JP | 2011523840 | 8/2011 |
| JP | 2012135755 | 7/2012 |
| JP | 2013149124 | 8/2013 |
| JP | 2014002729 | 1/2014 |
| JP | 2014509028 | 4/2014 |
| JP | 2014235133 | 12/2014 |
| JP | 2014239323 | 12/2014 |
| JP | 2015153406 | 8/2015 |
| JP | 2015228214 | 12/2015 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/016932 | 5/1997 |
| WO | WO 00/051190 | 8/2000 |
| WO | WO 01/059558 | 8/2001 |
| WO | WO 01/089003 | 11/2001 |
| WO | WO 02/073587 | 9/2002 |
| WO | WO 03/038800 | 5/2003 |
| WO | WO 03/100550 | 12/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/150667 | 10/2013 |
| WO | WO 13/169299 | 11/2013 |
| WO | WO 13/169302 | 11/2013 |
| WO | WO 13/173838 | 11/2013 |
| WO | WO 13/186846 | 12/2013 |
| WO | WO 13/186847 | 12/2013 |
| WO | WO 14/018086 | 1/2014 |
| WO | WO 14/098077 | 6/2014 |
| WO | WO 15/023670 | 2/2015 |
| WO | WO 16/141482 | 9/2016 |

OTHER PUBLICATIONS

U.S. Appl. No. 16/391,100, filed Apr. 22, 2019, Chen.
Actuator definition downloaded from http://www.thefreedictionary.com/actuator on May 3, 2018, 2 pages.
Astronomer's Toolbox, "The Electromagnetic Spectrum," http://imagine.gsfc.nasa.gov/science/toolbox/emspectrum1.html, updated Mar. 2013, 4 pages.
Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.
Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.
Kim et al., "Tactile Rendering of 3D Features on Touch Surfaces," UIST '13, Oct. 8-11, 2013, St. Andrews, United Kingdom, 8 pages.
Lee et al, "Haptic Pen: Tactile Feedback Stylus for Touch Screens," Mitsubishi Electric Research Laboratories, http://wwwlmerl.com, 6 pages, Oct. 2004.
Nakamura, "A Torso Haptic Display Based on Shape Memory Alloy Actuators," Massachusetts Institute of Technology, 2003, pp. 1-123.
PuntoCellulare, "LG-GD910 3G Watch Phone," YouTube (http://www.youtube.com/watch?v+HcCI87KIELM), Jan. 8, 2009, 9 pages.
Sullivan, Mark, "This Android Wear Update Turns Your Device into The Dick Tracy Watch," Fast Company (https://www.fastcompany.com/3056319/this-android-wear-update-turns-your-device-into-the-dick-tracy-watch), Feb. 4, 2016, 9 pages.

\* cited by examiner

SITUATIONALLY-AWARE ALERTS

CROSS-REFERENCE TO RELATED APPLICATION

This application is a divisional of U.S. patent application Ser. No. 16/015,367, filed Jun. 22, 2018, entitled "Situationally-Aware Alerts," which is a continuation of U.S. patent application Ser. No. 15/641,192, filed Jul. 3, 2017, entitled "Situationally-Aware Alerts," now abandoned, which is a continuation of U.S. patent application Ser. No. 15/251,459, filed Aug. 30, 2016, entitled "Situationally-Aware Alerts," now U.S. Pat. No. 10,039,080, which claims the benefit under 35 U.S.C. § 119(e) of U.S. Provisional Patent Application No. 62/303,964, filed on Mar. 4, 2016, and entitled "Situationally-Aware Alerts," the contents of which are incorporated by reference as if fully disclosed herein.

FIELD

The described embodiments relate generally to alerts. More particularly, the present embodiments relate to adjusting alerts based on a user's situation.

BACKGROUND

Many electronic devices provide various notifications, alerts, or other output to users. Such notifications may be visual, audio, haptic, and so on. For example, a smart phone that receives a communication such as a call or text or email message may indicate such on a screen, play a tone or other audio, and/or vibrate.

In general, notifications may be configured to be salient, or noticeable, to a user without being overly disturbing to others. For example, a smart phone may present a visual indicator on a display screen as well as playing a tone for an incoming call. The tone may assist the user in noticing the incoming call if the user is not currently looking at the display, but may be disturbing to others if the user is in the context of a meeting or other scenario where audio is overly noticeable.

SUMMARY

The present disclosure relates to electronic devices that provide situationally-aware alerts. An electronic device determines to provide alert output (such as a vibration or other haptic output, audio output, visual output, and so on) via an output device, determines a movement pattern based on one or more signals from one or more sensors indicating information relating at least to movement of the electronic device, and adjusts the alert output to account for the movement pattern. In some implementations, the electronic device may adjust the alert output by delaying the alert output. In other implementations, the electronic device may adjust the alert output by altering the alert output to be discernible despite the movement pattern based on a cadence of the movement pattern. In still other implementations, the electronic device may determine to provide the alert output in response to receiving an incoming communication and may prioritize incoming communications by adjusting the alert output differently based on an associated priority.

In various embodiments, an electronic device that provides situationally-aware alerts includes a haptic output device, a sensor operable to produce a signal indicating information relating to movement of the electronic device, and a processing unit connected to the sensor and the haptic output device. The processing unit is configured to determine to provide a haptic output via the haptic output device, determine a movement pattern based on the signal, and adjust the haptic output to account for the movement pattern by delaying the haptic output.

In some examples, the movement pattern indicates changes in elevation and the processing unit delays the haptic output until changes in elevation cease. In various implementations of such examples, the sensor includes a pressure sensor, the processing unit is configured to determine that the movement pattern indicates the changes in elevation based on the pressure sensor, and the processing unit is configured to delay the haptic output until the processing unit determines based on the pressure sensor that the changes in elevation have ceased.

In various examples, the processing unit is configured to determine a first period based on the movement pattern where the electronic device will be less proximate to a user (such as where the user is running and the electronic device is in the user's pocket and moves in the pocket further from the user and closer to the user in the pocket at different portions of the user's stride), determine a second period based on the movement pattern where the electronic device will be more proximate to the user, and delay the haptic output from the first period to the second period. In other examples, the processing unit delays the haptic output for a first period when the movement pattern indicates a first type of movement and delays the haptic output for a second period when the movement pattern indicates a second type of movement.

In numerous examples, the signal includes information indicating a heart rate of a user is elevated and the processing unit delays the haptic output until the heart rate of the user reduces. In various examples, the processing unit estimates a time when the haptic output will be salient despite the movement and delays the haptic output until the time.

In some embodiments, an electronic device that provides situationally-aware alerts includes a haptic output device, a sensor operable to produce a signal indicating information relating to movement of the electronic device, and a processing unit connected to the sensor and the haptic output device. The processing unit is configured to determine to provide a haptic output via the haptic output device, determine a movement pattern based on the signal, and adjust the haptic output to account for the movement pattern by altering the haptic output to be discernible despite the movement pattern based on a cadence of the movement pattern.

In various examples, the processing unit is configured to adjust a pattern of the haptic output to be mismatched with the cadence. In numerous examples, the processing unit is configured to alter the haptic output by time shifting the haptic output to a pause in the cadence.

In some examples, the processing unit is configured to determine to provide the haptic output in response to receiving an incoming communication, adjust the haptic output in a first manner when the incoming communication is associated with a first priority, and adjust the haptic output in a second manner when the incoming communication is associated with a second priority. In various examples, the processing unit is configured to alter the haptic output in a first manner when the movement pattern indicates a first type of movement and in a second manner when the movement pattern indicates a second type of movement. In numerous examples, the processing unit is configured to prompt for an acknowledgement of the adjusted haptic output, determine the acknowledgement has not been received, and provide additional haptic output until the acknowledgement is received.

In numerous embodiments, an electronic device that provides situationally-aware alerts includes a non-transitory storage medium storing instructions; a haptic output device; a sensor operable to produce a signal indicating information about a situation of a user of the electronic device; a communication component operable to receive an incoming communication associated with a priority; and a processing unit connected to the sensor, the communication component, the haptic output device, and the non-transitory storage medium. The processing unit is configured to execute the instructions to determine to provide a haptic output via the haptic output device in response to receiving the incoming communication; determine a movement pattern based on the signal; and adjust the haptic output to account for the movement pattern by delaying the haptic output when the incoming communication is associated with a first priority and by altering the haptic output to be discernible despite the movement pattern based on a cadence of the movement pattern when the incoming communication is associated with a second priority.

In various examples, the electronic device that provides situationally-aware alerts further includes an output device other than the haptic output device wherein the processing unit is configured to provide an output via the output device in addition to the haptic output. In some implementations of such examples, the output is at least one of visual output or audio output.

In numerous examples, the processing unit is configured to communicate with an additional electronic device and the processing unit signals the additional electronic device to produce output in addition to the haptic output. In various examples, the processing unit is configured to communicate with an additional electronic device and the processing unit evaluates the situation of the user by receiving data indicating a status of the additional electronic device that affects the situation of the user.

In some examples, the first and second priorities are based on at least one of a source of the incoming communication, a priority indicator included in the incoming communication, or a type of the incoming communication. In various examples, the first and second priorities are user assigned.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
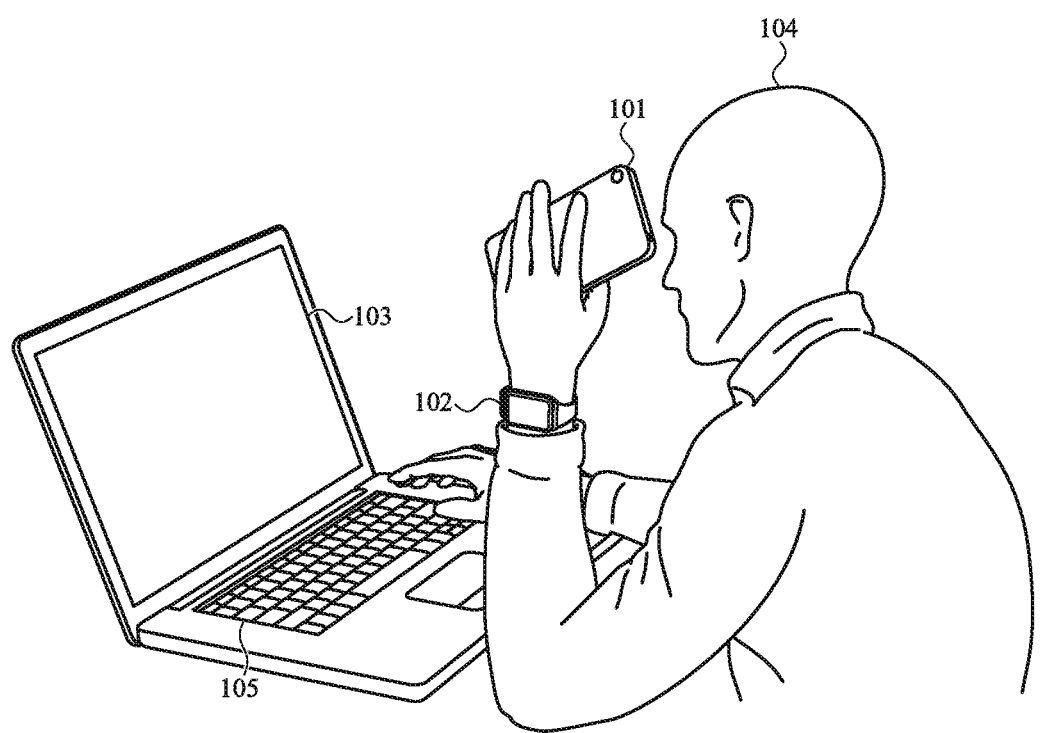
FIG. 1 is depicts an example system for providing situationally-aware alert output.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

Notifications and other output provided by an electronic device may be thwarted if they are not salient to a user. The situation in which a user is in (e.g., activities the user is performing, activities going on around the user, a location where the user is, and so on) may affect the salience of a notification. For example, movement of a user may decrease the salience of a vibration or other notification related output. By way of another example, a user may be located in a highly distracting environment (high noise level and so on) and/or engaged in other activities that decreases the salience of such a vibration. In yet another example, a user's cognitive state may affect perceived salience. When the user is engaged in a highly demanding cognitive task, when the user's attention is focused away from the electronic device, and so on, the user's absorbed cognitive state may reduce perceived salience of a vibration or other notification related output.

Larger actuators or other output components may be used, and/or larger amounts of power may be provided to actuators or other output components, in order to increase the salience of vibrations despite a user's situation. However, these sorts of solutions may still not ensure that a user notices a notification or other output and may not be feasible given space, power, and/or other electronic device constraints.

Further, the situation in which a user is in may make the salience of a vibration or other notification related output too noticeable. Sound related to a vibration provided by an electronic device may be salient to people other than the user in a meeting or other situation where sound is particularly noticeable. This may be exacerbated if the electronic device is on a surface such as a table that may amplify the vibration. In such a situation, it may be desirable to decrease the salience of the vibration such that it is still noticeable by the user but not others, or to prevent the notification from being annoyingly strong to the user. Efforts such as larger actuators or other output components and/or larger amounts of power discussed above to ensure salience in situations that decrease salience may further exacerbate these issues if increased salience is not necessary.

The following disclosure relates to an electronic device that adjusts alert output based on a user's situation in order to increase salience of the alert output when the user's situation merits increased salience. The alert output may be vibrations or other haptic output, visual output, audio output, and so on. Adjusting the alert output may include delaying the alert output, altering one or more parameters of the alert output (such as amplitude of a vibration, frequency of a vibration, and so on), and so on. The electronic device may determine to provide an alert output, evaluate the user's situation based on information from one or more sensors, and increase salience by adjusting the alert output based on the user's situation.

In some embodiments, the alert output may be haptic output and increasing salience may include providing output via an output device other than and/or in addition to the haptic output. For example, the electronic device may provide an audio or visual output instead of and/or in addition to the haptic output if the electronic device evaluates the user's situation to affect salience of the haptic output too adversely.

In various embodiments, increasing salience may include signaling another electronic device to provide the alert output and/or other output rather than and/or in addition to the electronic device. Similarly, the sensor data the electronic device uses to evaluate the user's situation may be received by the electronic device from other electronic devices with which the electronic device communicates.

In a particular embodiment, the electronic device may evaluate data from one or more sensors to determine that the user is moving. The electronic device may evaluate the data to determine a movement pattern and adjust the alert output to account for the movement pattern. In some implementations, the electronic device may adjust the alert output by delaying the alert output based on the movement pattern, such as delaying until the user is no longer moving or the user's activity level declines, delaying to when the electronic device will be more proximate to the user than another time, delaying different time periods based on different types of movement, delaying until a time the electronic device estimates the alert output will be salient despite the movement, and so on. In other implementations, the electronic device may adjust the alert output by altering the alert output to be discernible despite the movement pattern based on a cadence of the movement pattern, such as by mismatching the alert output with a cadence of the movement pattern, altering the alert output in different manners based on different types of movement, and so on.

In still other implementations, the electronic device may adjust the alert output to account for the movement pattern by delaying the alert output in some situations and altering the alert output to be discernible despite the movement pattern based on a cadence of the movement pattern in other situations. For example, the electronic device may utilize priorities to prioritize some alerts over others. An alert output may be associated with a priority such as an urgency priority. The electronic device may delay the alert output if the priority is a first priority and may alter the alert output if the priority is a second priority.

By way of example, the alert output may be provided in response to receiving an incoming communication. In such an example, the electronic device may include a list of contacts organized into different priorities such as very important (VIP) contacts and non-VIP contacts. The electronic device may adjust the alert output in a first way if the source of the incoming communication is a VIP contact and in a second way if the source of the incoming communication is a non-VIP contact. In other implementations of such an example, the priority may be otherwise be associated with a source of the communication, a priority indicator included in the incoming communication, a type of the incoming notification, and so on.

In various embodiments, the electronic device may increase salience of the alert output by prompting for an acknowledgement of the alert output. If the acknowledgement is not received, such as after a period of time after providing a prompt, the alert output may be provided again. In some implementations, the alert output may be provided repeatedly until acknowledged.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 is depicts an example system 100 for providing situationally-aware alert output. The system 100 includes an electronic device 101 that provides situationally-aware alerts. The electronic device 101 may determine (such as in response to receiving one or more incoming communications) to provide alert output (such as vibrations or other haptic output, visual output, audio output, and so on), evaluate a user's 104 situation based on information from one or more sensors, and increase salience by adjusting the alert output based on the user's 104 situation.

Many different aspects of the user's 104 situation may affect salience of the alert output. As such, the electronic device 101 may analyze a variety of different data in evaluating a variety of different aspects of the user's 104 situation. Such aspects may involve ambient noise levels, ambient light levels, the cognitive state of the user 104, motion of the user 104, health data of the user 104, whether or not the user 104 is climbing stairs, whether or not the user 104 is driving, and so on. Such aspects may also involve activities the user is performing on other electronic devices with which the electronic device 101 may communicate, such as a first other electronic device 103 and a second other electronic device 102 (such as typing on a keyboard 105 of the first other electronic device 103, playing music on the second other electronic device 102, and so on). The electronic device 101 may receive signals from one or more different sensors indicating data the electronic device 101 may use in evaluating the user's 104 situation.

In various implementations, such sensors may be components of the electronic device 101. However, such sensors may also be components of one or more other electronic devices with which the electronic device 101 may communicate such as the first other electronic device 103 and the second other electronic device 102.

The electronic device 101 may evaluate data from one or more sensors to determine that the user is moving. The electronic device 101 may evaluate the data to determine a movement pattern and adjust the alert output (such as by delaying the alert output, altering one or more parameters of the alert output, and so on) to account for the movement pattern. In some implementations, the electronic device 101 may delay the alert output based on the movement pattern. In other implementations, the electronic device may alter the alert output to be discernible despite the movement pattern based on a cadence of the movement pattern. In still other implementations, the electronic device 101 may adjust the alert output to account for the movement pattern by delaying the alert output in some situations and altering the alert output to be discernible despite the movement pattern based on a cadence of the movement pattern in other situations.

For example, incoming communications received by the electronic device 101 may be prioritized with respect to other incoming communications. In various situations, incoming communications from some senders may be prioritized over other incoming communications from other senders, incoming communications associated with some applications may be prioritized over incoming communications associated with other applications, incoming communications having certain content may be prioritized over incoming communications having other content, and so on.

By way of example, the electronic device 101 may determine to provide an alert output in response to receiving an incoming communication that is associated with a priority according to a source of the incoming communication. The electronic device 101 may delay the alert output if the priority is a first priority and may alter the alert output and/or provide the alert output if the priority is a second priority. Although this example is described using first and second priorities, it is understood that this is an illustration. In various examples, priority may vary continuously and handling of corresponding alerts may also vary continuously.

In various implementations, the electronic device 101 may include different profiles for providing situationally-aware alert output in different situations. For example, the electronic device 101 may be configured for the user 104 to increase salience differently when the user 104 is working, at home during waking hours, at home during sleeping hours, driving, and so on. For each situation, the different profiles may specify how salience of alert outputs is to be determined, when to increase salience, how to increase salience, and so on. Such profiles may be specified by the user 104, configured by default for the user 104, and so on.

Although the electronic device 101 is described above as providing the alert output, it is understood that this is an example. In some implementations, the electronic device 101 may signal one or more of the first other electronic device 103 and the second other electronic device 102 based on evaluation of the user's 104 situation to provide alert output and/or other output (such as visual output, audio output, and so on) instead of and/or addition to the electronic device 101 providing the alert output.

Further, although the electronic device 101 is illustrated as a smart phone, the first other electronic device 103 is illustrated as a laptop computing device, and the second other electronic device 102 is illustrated as a wearable device, it is understood that these are examples. In various implementations, the electronic device 101, the first other electronic device 103, and the second other electronic device 102 may be a variety of different electronic and/or other devices without departing from the scope of the present disclosure.

Figure 2:
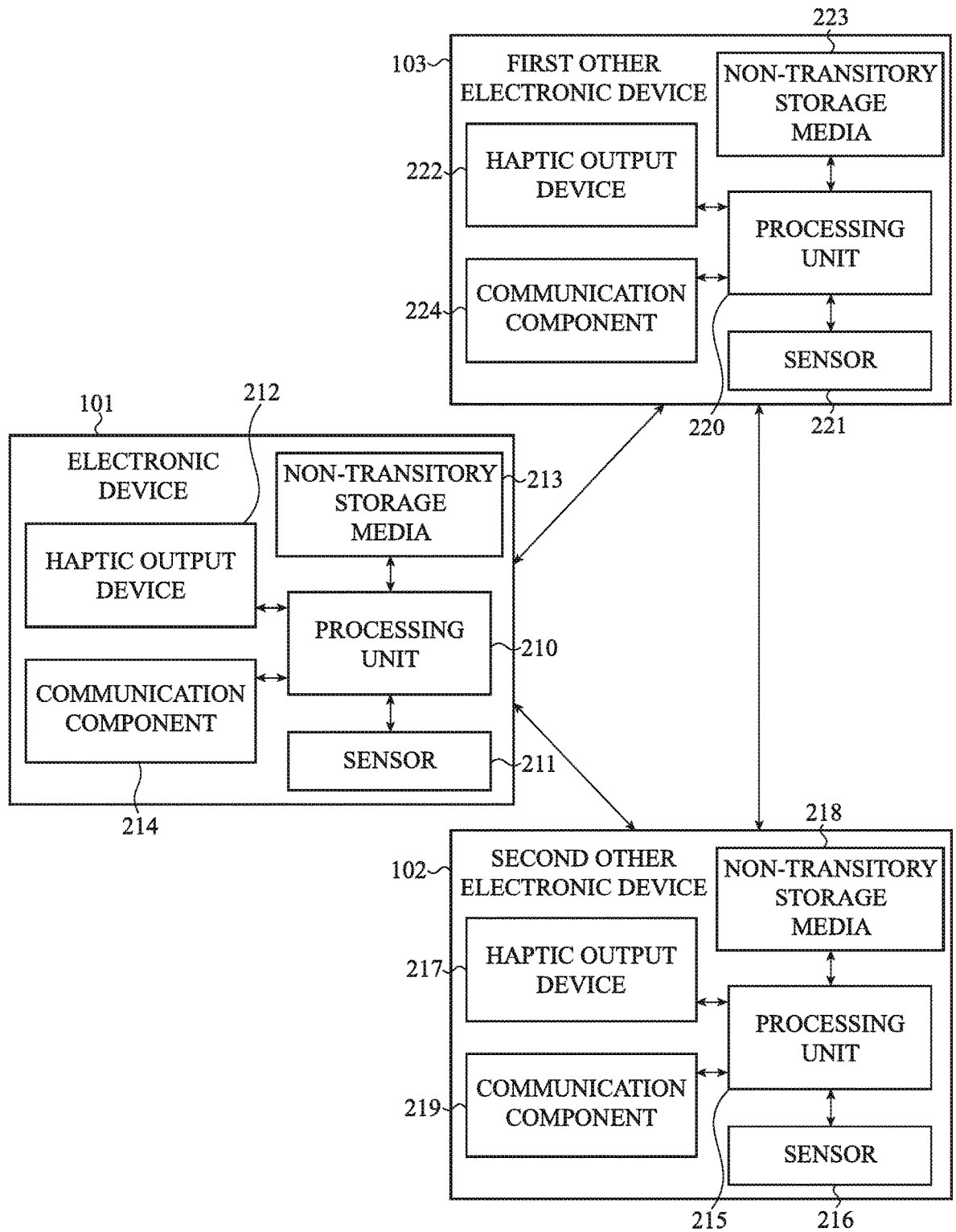
FIG. 2 depicts a block diagram illustrating sample components of the system of FIG. 1 and sample functional relationships among those components.

FIG. 2 depicts a block diagram illustrating sample components of the system 100 of FIG. 1 and sample functional relationships among those components. The electronic device 101 may include one or more processing units 210, one or more sensors 211, one or more haptic output devices 212, one or more non-transitory storage media 213, one or more communication components 214, and so on.

The processing unit 210 may execute instructions stored in the non-transitory storage media 213 to perform a variety of different functions. For example, the processing unit 210 may execute such instructions to receive one or more signals from the one or more sensors 211, communicate with the first other electronic device 103 and/or the second other electronic device 102 via the communication component 214, provide haptic output via the haptic output device 212, and so on. The processing unit 210 may also execute the instructions to perform various methods of providing situationally aware haptic output. Such methods may involve determining to provide a haptic output, evaluate a user's situation based on information from the one or more sensors 211, and increasing salience by adjusting the haptic output based on the user's situation.

The haptic output devices 212 may be one or more actuators or other vibration producing components. The non-transitory storage media 213 may take the form of, but is not limited to, a magnetic storage medium; optical storage medium; magneto-optical storage medium; read only memory; random access memory; erasable programmable memory; flash memory; and so on. The communication components 214 may be one or more cellular antennas, WiFi antennas, Bluetooth antennas, and so on.

The one or more sensors 211 may be one or more of a variety of different sensors. Such sensors may include, but are not limited to, one or more accelerometers, gyroscopes, global positioning system (GPS) or other navigation system components, communication components (such as by tracking WiFi network handoffs, cellular handoffs, and/or other events of various communication networks with or without other associated information such as GPS data associated with network components), compasses, magnetometers, hall effect sensors, barometric or other pressure sensors, cameras, microphones, image sensors, inertial sensors, barometers, health sensors (such as photoplethysmogram sensors that may be used to determine a heart rate of the user and/or other information regarding the body of the user), touch pressure sensors, sensors that monitor a user's cognitive state (such as one or more heart rate sensors, eye movement sensors, galvanic skin response sensors, sensors that monitor use and activity on one or more other devices, and so on), combinations thereof, and so on. The communication components may be used to obtain sensor data by utilizing data from the communication components to track WiFi network handoffs, cellular handoffs, and/or other events of various communication networks with or without other associated information such as GPS data associated with network components.

Similarly, the first other electronic device 103 may include one or more processing units 220, one or more sensors 221, one or more haptic output devices 222, one or more non-transitory storage media 223, one or more communication components 224, and so on. Likewise, the second other electronic device 102 may include one or more processing units 215, one or more sensors 216, one or more haptic output devices 217, one or more non-transitory storage media 218, and one or more communication components 219.

Although FIG. 2 is illustrated and described above as including a haptic output device 212 and providing situationally aware haptic output, it is understood that this is an example. In various implementations, other kinds of situationally aware alert output may be provided. Such alert output may include audio output, video output, and so on.

Figure 3:
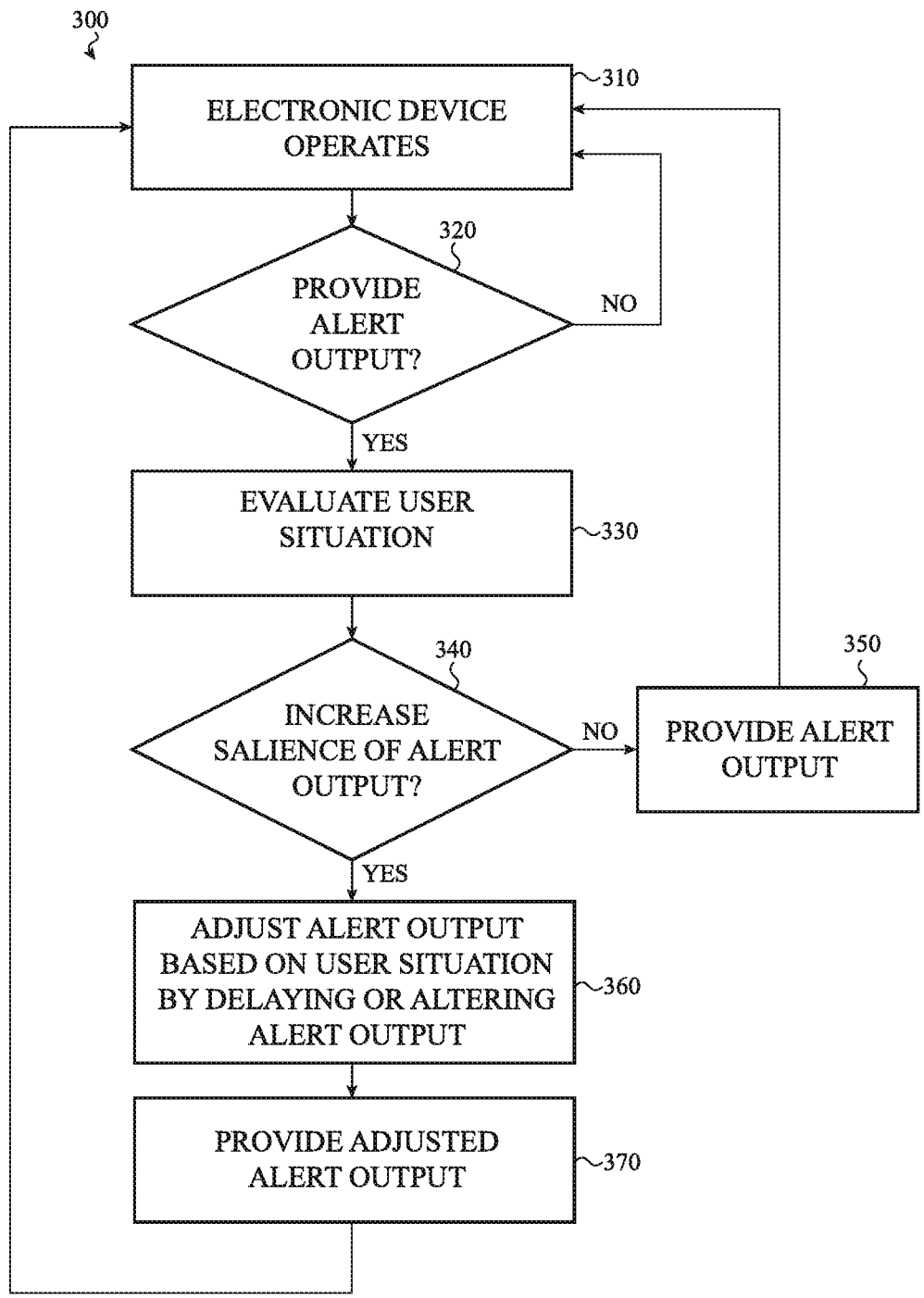
FIG. 3 is a flow chart illustrating a first example method for providing situationally-aware alert output. This first example method may be performed by the example system of FIGS. 1-2.

FIG. 3 is a flow chart illustrating a first example method 300 for providing situationally-aware alert output. This first example method 300 may be performed by the example system 100 of FIGS. 1-2.

The flow begins at block 310 where an electronic device operates. The flow then proceeds to block 320 where the electronic device determines whether or not to provide an alert output (such as a vibration or other haptic output, audio output, visual output, and so on). The electronic device may determine to provide an alert output in response to receiving an incoming communication (such as an email, a text message, a social media communication, a telephone call, and so on), in response to triggering of a reminder such as a calendar or other schedule reminder, based on the status of a resource such as a battery power level falling below a threshold level or a change in a connection to a communication network, based on a status change of an executing application such as the completion of a download, and/or any other event for which the electronic device determines to provide a notification or other output to a user. If so, the flow proceeds to block 330. Otherwise, the flow returns to block 310 where the electronic device continues to operate.

At block 330, the electronic device evaluates the user's situation before proceeding to block 340. The electronic device may evaluate data regarding a variety of different aspects of the user's situation from a variety of different sensors included the electronic device and/or other electronic devices with which the electronic device communicates.

For example, the electronic device may determine an ambient noise level of the user's situation using one or more microphones. By way of another example, the electronic device may determine an illumination level of the user's situation using one or more ambient light sensors or other light detectors.

By way of still another example, the electronic device may analyze data to determine a movement pattern of the user or other movement information using data from one or more accelerometers, gyroscopes, GPS or other navigation system components, communication components (such as by tracking WiFi network handoffs, cellular handoffs, and/or other events of various communication networks with or without other associated information such as GPS data associated with network components), compasses, magnetometers, hall effect sensors, barometric or other pressure sensors, cameras, microphones, image sensors, inertial sensors, barometers, health sensors (such as photoplethysmogram sensors that may be used to determine a heart rate of the user and/or other information regarding the body of the user), touch pressure sensors, combinations thereof, and so on. The electronic device may determine a variety of information about the user's movement as part of determining the movement pattern such as a movement speed, a movement cadence, whether the use is changing elevation, an exertion level of the user, a type of the movement (e.g., jogging, running, walking, climbing stairs, bicycling, driving, riding in a car, and so on), and/or a variety of other different information regarding the pattern of the user's movement.

By way of still another example, the electronic device may receive a communication from an associated device indicating that a user of the electronic device is involved in a distracting activity using the other electronic device that may impact salience of the alert output. For example, the other electronic device may be playing audio or video, the user may be typing on a keyboard and/or otherwise entering input on an input device of the other electronic device, and so on. The electronic device may determine a distraction level of the user's situation based on one or more communications from the other electronic device regarding such distracting activities that may impact salience of the alert output.

At block 340, the electronic device determines whether or not to increase salience of the alert output based on the user's situation (such as by adjusting the alert output, which may include delaying the alert output, altering one or more parameters of the alert output, and so on). The electronic device may determine by evaluating the user's situation that the alert output will be salient as is and the salience of the alert output should not be increased. Alternatively, the electronic device determines by evaluating the user's situation that the alert output may not be salient as is (such as where the user's situation is too loud, too distracting, and so on) and the salience of the alert output should be increased. If so, the flow proceeds to block 360. Otherwise, the flow proceeds to block 350.

At block 350, after the electronic device determines not to increase the salience of the alert output, the electronic device provides the alert output. The flow then returns to block 310 where the electronic device continues to operate.

At block 360, after the electronic device determines to increase the salience of the alert output, the electronic device adjusts the alert output based on the user situation by delaying or altering the alert output. Such adjustment may include altering the time at which the alert output is provided (such as by delaying a period of time), altering one or more parameters of the alert output (such as providing a different waveform to an actuator, altering an amplitude of a waveform provided to an actuator, altering a phase of a waveform provided to an actuator, increasing power provided to an actuator, and so on), providing other output (such as visual, audio, and so on) instead of and/or in addition to the alert output, providing other alert output (which may have similar or different output characteristics than the alert output) via an electronic device with which the electronic device communicates instead or and/or in addition to alert output the electronic device may provide, and so on.

The flow then proceeds to block 370 where the electronic device provides the adjusted alert output based on the user's situation. The flow then returns to block 310 where the electronic device continues to operate.

For example, the alert output may be a haptic output. The electronic device may analyze data from one or more microphones to determine that the user is in a high noise environment. Such a high noise environment may reduce the possibility that the user will notice the haptic output. In response, the electronic device may increase a vibration amplitude included in the haptic output to increase the salience of the haptic output in the high noise environment. Additionally or alternatively, the electronic device may provide a different type of alert output such as a visual alert (e.g., flash a light emitting diode and so on).

By way of another example, the electronic device may analyze data from accelerometers, motion sensors, communication components, and/or other sensors and determine that the user is driving. The user may not notice haptic output while driving. However, the user's vehicle may be communicably connected to the electronic device and may be capable of providing vibrations or other haptic output via the steering wheel or other portion of the user's vehicle that the user touches while driving. As such, the electronic device may signal the user's vehicle to provide haptic output via the steering wheel or other portion instead of and/or in addition to the electronic device providing the haptic output. Additionally or alternatively, the electronic device may provide and/or signal the user's vehicle to provide another type of alert, such as audio through one or more speakers, visual indications through a display, and so on.

Although the example method 300 is illustrated and described as including particular operations performed in a particular order, it is understood that this is an example. In various implementations, various orders of the same, similar, and/or different operations may be performed without departing from the scope of the present disclosure.

For example, the example method 300 is illustrated and described as determining whether or not to increase salience of the haptic output based on the user's situation. However, in some implementations, the electronic device may determine whether or not to decrease salience of the alert output based on the user's situation.

By way of example, the alert output may be a haptic output and the electronic device may analyze data from GPS or other navigation sensors and/or other sensors and so on to determine that the user is in a quiet environment such as a meeting or a movie theater. Such a quiet environment may allow the user to notice the haptic output, but may cause the haptic output to be undesirably noticeable to others. In response, the electronic device may decrease a vibration amplitude included in the haptic output to decrease the salience of the haptic output in the quiet environment so that the adjusted haptic output will still be noticeable to the user but will not be undesirably noticeable to others or noticeable to others at all.

Alternatively, rather than altering the haptic output, the electronic device may delay the haptic output. For example, in situations where the electronic device determines that the user is in a movie theater, the electronic device may delay the haptic output until an ambient light sensor detects increased light. This may correspond to a movie being finished, the user leaving the movie theater, and/or other situations where the haptic output may no longer be undesirably noticeable to others.

By way of another example, the electronic device may analyze data from motion sensors and/or other sensors and determine that the electronic device is on a surface that amplifies haptic output such as a hard surface table top (such by analyzing that the electronic device is subject to very little motion, among other conditions). Amplification of the haptic output may not make the haptic output less salient to the user, but may make the haptic output unpleasant or undesirably noticeable to others. As such, the electronic device may modify vibration included in the haptic output to modify how the haptic output will be amplified so that the adjusted haptic output will still be noticeable to the user but will not be unpleasant and/or undesirably noticeable to others.

In various examples, the electronic device may increase and/or decrease salience of an output based on how the user's cognitive state affects the user's situation. For example, the electronic device may determine the user is engaged in a highly demanding cognitive task, that the user's attention is focused away from the electronic device, and so on. Based on that determination, the electronic device may determine to increase salience (e.g., escalate) of the output. Alternatively or additionally, based on the determination, the electronic device may determine to decrease salience (e.g., de-escalate) or delay the output to avoid distracting the user when the user is involved in a demanding task or has his attention elsewhere.

Figure 4:
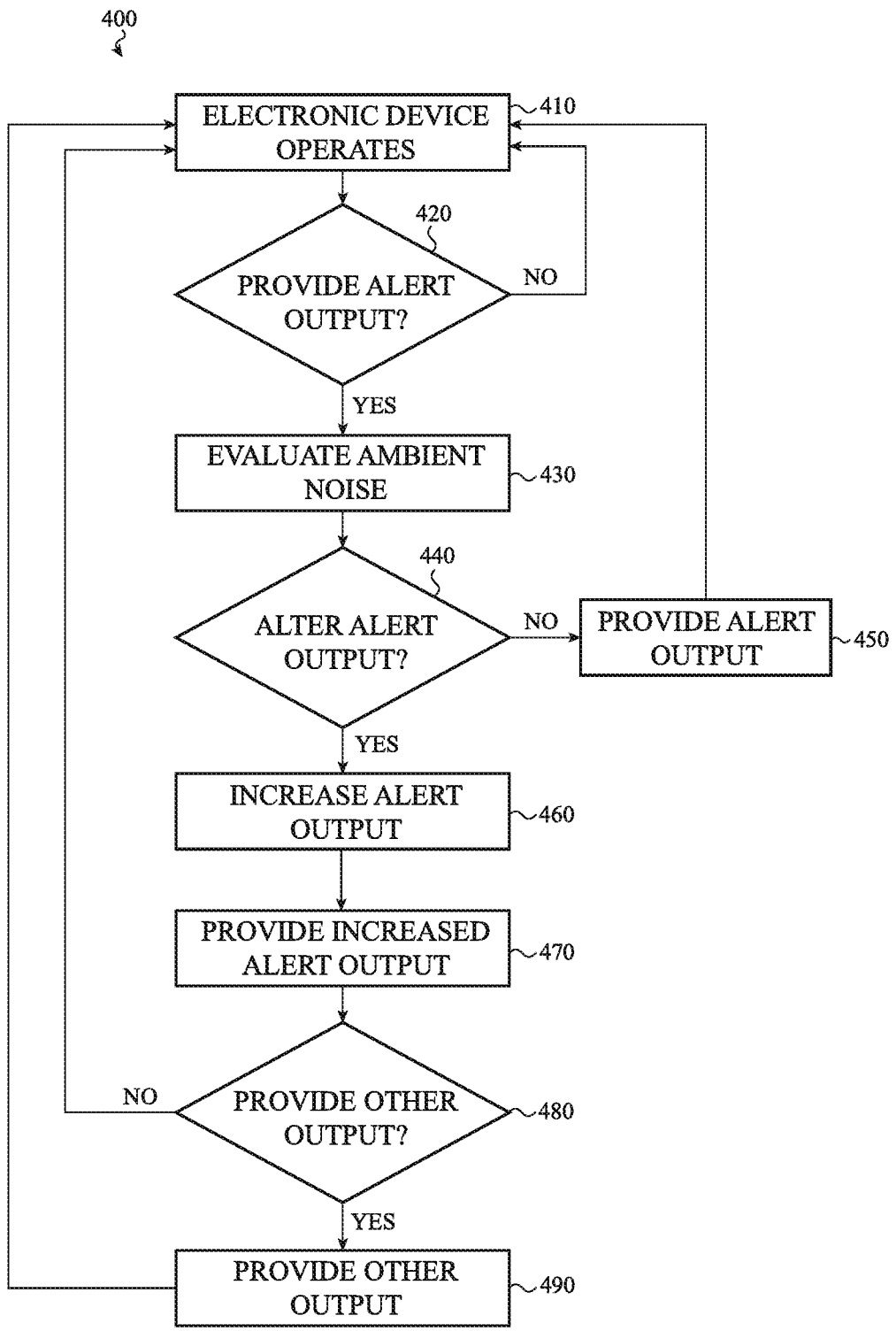
FIG. 4 is a flow chart illustrating a second example method for providing situationally-aware alert output. This second example method may be performed by the example system of FIGS. 1-2.

FIG. 4 is a flow chart illustrating a second example method 400 for providing situationally-aware alert output. This second example method 400 may be performed by the example system 100 of FIGS. 1-2.

The flow begins at block 410 where an electronic device operates. The flow then proceeds to block 420 where the electronic device determines whether or not to provide an alert output (such as a vibration or other haptic output, audio output, visual output, and so on). If so, the flow proceeds to block 430. Otherwise, the flow returns to block 410 where the electronic device continues to operate.

At block 430, the electronic device evaluates ambient noise in the user's situation using data from one or more microphones and/or other sensors. The flow then proceeds to block 440.

At block 440, the electronic device determines whether or not to alter the alert output because of the ambient noise in the user's situation (though in various implementations the electronic device may delay the alert output, such as until the ambient noise changes, rather than alter the alert output). The electronic device may determine to alter the alert output if the ambient noise in the user's situation exceeds a first threshold. If not, the flow proceeds to block 450 where the electronic device provides the alert output before the flow returns to block 410 and the electronic device continues to operate. Otherwise, the flow proceeds to block 460.

At block 460, after the electronic device determines to alter the alert output because of the ambient noise in the user's situation, the electronic device increases the alert output. The flow then proceeds to block 470 where the electronic device provides the increased alert output.

The flow then proceeds to block 480 where the electronic device determines whether or not to provide other output. Such other output may be haptic output, visual output provided via a visual output device, audio output provided via an audio output device, output provided by another electronic device with which the electronic device communicates, and/or any other output. The electronic device may determine to provide the other output if the ambient noise in the user's environment exceeds both the first and a second threshold. If not, the flow returns to block 410 and the electronic device continues to operate. Otherwise, the flow proceeds to block 490.

At block 490, after the electronic device determines to provide other output, the electronic device provides the other output. The flow then returns to block 410 and the electronic device continues to operate. Additionally and/or alternatively, the other output may be adjusted based on the user's situation in addition to and/or instead of adjusting the alert output.

Although the example method 400 is illustrated and described as including particular operations performed in a particular order, it is understood that this is an example. In various implementations, various orders of the same, similar, and/or different operations may be performed without departing from the scope of the present disclosure.

For example, the example method 400 is illustrated and described as determining whether or not to increase the alert output based on ambient noise the user's situation. However, in some implementations, the electronic device may determine whether or not to decrease the alert output based on ambient noise the user's situation.

By way of example, the electronic device may analyze ambient noise in the user's situation and determine that the alert output may be too noticeable based on the user's situation having below a threshold amount of ambient noise. In response, the electronic device may decrease the alert output to make the alert output more suited for the user's situation while still allowing the alert output to remain salient.

Further, the example method 400 is illustrated and described as determining to alter the alert output and/or provide other output based on comparison of ambient noise to first and second thresholds. However, it is understood that this is an illustration. In various examples, provided alerts may be varied continuously in response to a continuous scale of ambient noise.

Figure 5:
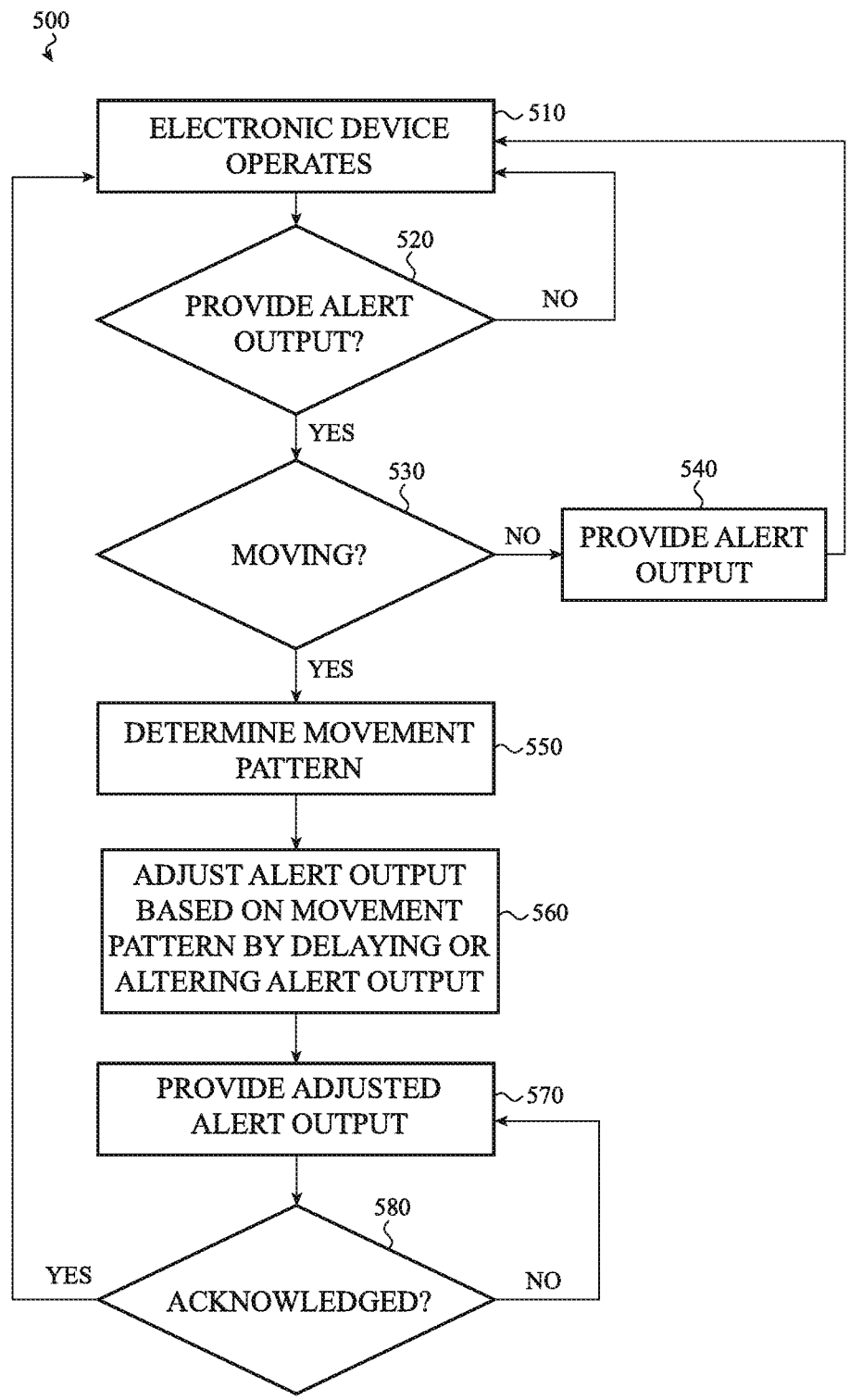
FIG. 5 is a flow chart illustrating a third example method for providing situationally-aware alert output. This third example method may be performed by the example system of FIGS. 1-2.

FIG. 5 is a flow chart illustrating a third example method 500 for providing situationally-aware alert output. This third example method 500 may be performed by the example system 100 of FIGS. 1-2.

The flow begins at block 510 where an electronic device operates. The flow then proceeds to block 520 where the electronic device determines whether or not to provide an alert output (such as a vibration or other haptic output, audio output, visual output, and so on). If so, the flow proceeds to block 530. Otherwise, the flow returns to block 510 where the electronic device continues to operate.

At block 530, the electronic device determines whether or not the user is moving. The electronic device may utilize signals from one or more accelerometers, gyroscopes, inertial sensors, communication components, barometric or other pressure sensors, altimeters, magnetometers, and/or other sensors to determine whether or not the user is moving. If not, the flow proceeds to block 540 where the electronic device provides the alert output before the flow returns to block 510 and the electronic device continues to operate. Otherwise, the flow proceeds to block 550.

At block 550, the electronic device determines a movement pattern of the user using the signals from the one or more sensors. The electronic device may determine a variety of different data about the user's movement pattern. The movement pattern may include a cadence of the user's movement pattern, a heart rate or other health data of the user related to the movement pattern, whether or not the user is changing elevation (such as ascending and/or descending, the rate of change, and so on), a speed of the user's movement pattern, and/or any other such information about the pattern of the user's movement.

The flow then proceeds to block 560 where the electronic device adjusts the alert output (such as by adjusting the alert output, which may include delaying the alert output, altering one or more parameters of the alert output, and so on) based on the user's movement pattern by delaying or altering the alter output. In some implementations, adjusting the alert output may include delaying the alert output. The alert output may be delayed until the movement stops or the electronic device estimates the movement will stop, until a user who has been determined (such as using a pressure sensor) to be changing elevation (such as walking up stairs or a ramp, riding an escalator or an elevator, and so on) ceases changing elevation or the electronic device estimates the user will stop changing elevation, until the electronic device estimates the alert output will be salient despite the movement, until a user's heart rate or other health data of the user related to the movement reduces or otherwise changes, a specific time interval (such as thirty seconds), and so on.

In implementations where adjusting the alert output includes delaying the alert output by a period of time, the electronic device may delay for different periods of time based on a variety of factors. For example, the electronic device may determine based on the movement pattern that the electronic device will be less proximate to a user after a first period of time (such as five seconds) and more proximate to the user after a second period of time (such as ten seconds), such as where the electronic device is located in the user's pocket and thusly moving within the pocket closer to and further from the user as part of the movement pattern. In such an example, the electronic device may delay the alert output by the second period of time.

By way of a second example, the electronic device may determine a type of motion based on the movement pattern, such as running motion, walking motion, stair climbing motion, dancing motion, driving motion, and so on. The processing unit may delay the alert output different periods based on the type of motion. In some examples, the processing unit may delay the alert output by a first period (such as twenty seconds) when the movement pattern indicates a first type of motion (such as walking motion) and by a second period (such as forty seconds) when the movement pattern indicates a second type of motion (such as running motion).

In various implementations, the electronic device may estimate a time when the alert output will be salient despite the movement, such as where the movement pattern indicates the movement will pause. In such an implementation, the electronic device may delay until that time.

In other implementations, adjusting the alert output may include altering the alert output to be discernible despite the movement pattern based on a cadence of the user and alter the alert output based thereupon. In such implementations, the electronic device may determine a cadence of the movement pattern. A cadence of a movement pattern may involve the rhythm of body parts such as legs involved in the motion, the rate at which they move, and so on.

For example, the electronic device may alter a pattern of the alert output (such as the waveform of haptic output) to be mismatched with the cadence. As the altered alert output is mismatched to the cadence of the movement pattern, the altered alert output may be more salient despite the movement.

By way of another example, the cadence of the movement pattern may involve pauses in motion. The electronic device may alter the alert output by time shifting the alert output to such a pause in the cadence.

In numerous examples, the processing unit may alter the alert output in different manners based on the type of motion. In some examples, the processing unit may alter the alert output in a first manner when the movement pattern indicates a first type of motion (such as driving motion) and in a second manner when the movement pattern indicates a second type of motion (such as flying motion). Although these examples are described as altering alert output in a first manner for a first type of motion and in a second manner for a second type of motion, it is understood that this is an illustration. In various examples, alert output may be continuously varied based on a continuous scale of motion.

In various examples, the alert output may be provided in response to an incoming communication such as an email, text message, phone call, and so on. The incoming communication may have an associated priority. Such a priority may be based on a source of the incoming communication (such as a first priority for communications from very important person or VIP contacts compared to a second priority for other contacts), a priority in indicator included in the incoming communication (such as an urgent priority flag indicating a first priority included in the communication or normal priority flag indicating a second priority included in the communication) or a type of the communication (such as a first priority for email communications and a second priority for text message communications). The priority may be user assigned. The electronic device may adjust the alert output differently based on the associated priority.

For example, the electronic device may delay the alert output if the associated priority is a first priority and alter the alert output based on a cadence of the movement if the associated priority is a second priority. By way of another example, the electronic device may delay the alert output a first period if the associated priority is a first priority and delay the alert output a second period if the associated priority is a second priority. By way of still another example, the electronic device may alter the alert output based on a cadence of the movement in a first manner if the associated priority is a first priority and alter the alert output based on a cadence of the movement in a second manner if the associated priority is a second priority. Although this example is described as delaying a first period for a first priority and a second period for a second priority, it is understood that this is an illustration. In various examples, alert output may be delayed on a continuous scale for a continuous priority scale.

After the electronic device adjusts the alert output based on the user's movement pattern, the flow proceeds to block 570 where the electronic device provides the adjusted alert output. The flow then proceeds to block 580.

At block 580, the electronic device determines whether or not the adjusted alert output has been acknowledged. The electronic device may prompt for acknowledgement when the adjusted alert output is provided so that the electronic device can ensure that the provided output was salient to the user. If so, the flow may return to 510 where the electronic device continues to operate.

Otherwise, the flow may return to block 570 where the adjusted alert output is again provided. The electronic device may continue providing the adjusted alert output periodically, at intervals, and/or otherwise repeatedly providing the adjusted alert output until the provided output is acknowledged.

Although the example method 500 is illustrated and described as including particular operations performed in a particular order, it is understood that this is an example. In various implementations, various orders of the same, similar, and/or different operations may be performed without departing from the scope of the present disclosure.

For example, the example method 500 is illustrated and described as the electronic device altering the alert output if the electronic device is moving. However, in some implementations, the electronic device may determine that the electronic device is moving and further determine whether or not the motion will affect salience of the alert output. In such an example, the electronic device may alter the alert output if the motion will affect salience and not alter the alert output if the motion will not affect salience.

By way of another example, the example method 500 is illustrated and described as the electronic device providing the altered alert output if the electronic device is moving. However, in some implementations, the electronic device may determine that another electronic device with which it communicates is not moving or is moving in a way that will not affect salience. In such implementations, the electronic device may adjust the alert output by signaling the other electronic device to provide the alert output. For example, a user's smart phone may be moving significantly while the user is jogging but a user's wearable device may not be and the smart phone may signal the wearable device to provide the alert output.

Figure 6:
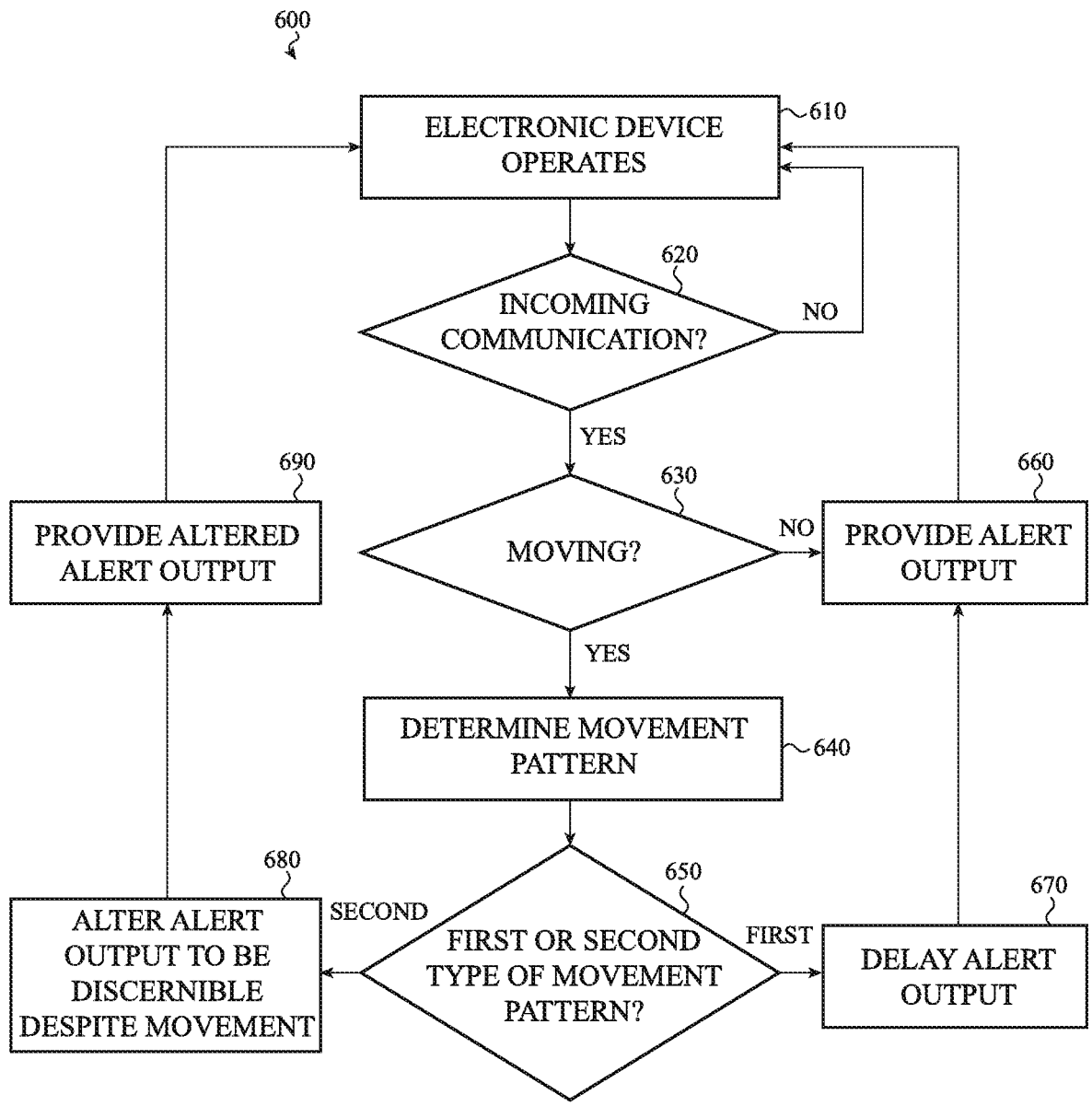
FIG. 6 is a flow chart illustrating a fourth example method for providing situationally-aware alert output. This fourth example method may be performed by the example system of FIGS. 1-2.

FIG. 6 is a flow chart illustrating a fourth example method 600 for providing situationally-aware alert output. This fourth example method 600 may be performed by the example system 100 of FIGS. 1-2.

The flow begins at block 610 where an electronic device operates. The flow then proceeds to block 620 where the electronic device determines whether or not an incoming communication is received. If so, the flow proceeds to block 630. Otherwise, the flow returns to block 610 where the electronic device continues to operate.

At block 630, the electronic device determines whether or not the user is moving. If not, the flow proceeds to block 660 where the electronic device provides alert output (such as a vibration or other haptic output, audio output, visual output, and so on) before the flow returns to block 610 and the electronic device continues to operate. Otherwise, the flow proceeds to block 640.

At block 640, the electronic device determines a movement pattern of the user using the signals from the one or more sensors. Next, the flow proceeds to block 650 where the electronic device determines whether the movement pattern is a first type of movement pattern (such as walking) or a second type of movement pattern (such as running).

If the movement pattern is the first type of movement pattern, the flow proceeds to block 670 where the electronic device delays the alert output. The flow then proceeds after the delay to block 660 where the electronic device provides the alert output.

If the movement pattern is the second type of movement pattern, the flow proceeds to block 680 where the electronic device alters the alert output to be discernible despite the movement based on a cadence of the movement pattern. Next, the flow proceeds to block 690 where the electronic device provides the altered alert output. The flow then returns to block 610 where the electronic device continues to operate.

Although the example method 600 is illustrated and described as including particular operations performed in a particular order, it is understood that this is an example. In various implementations, various orders of the same, similar, and/or different operations may be performed without departing from the scope of the present disclosure.

For example, the example method 600 is illustrated and described as adjusting the alert output to account for the movement pattern in a first way when the movement pattern is a first type of movement and a second way when the movement pattern is a second type of movement. However, it is understood that this is an example. In various implementations, the electronic device may adjust the alert input in a variety of different ways based on a variety of different types of movement and/or based on other factors without departing from the scope of the present disclosure. Alternatively, the alert output may be provided to the user without adjustment.

Further, the example method 600 is illustrated and described as handling the alert output differently based on first or second types of movement patterns. However, it is understood that this is an illustration. In various examples, alert output may be varied continuously in response to a continuous scale of movement patterns.

Figure 7:
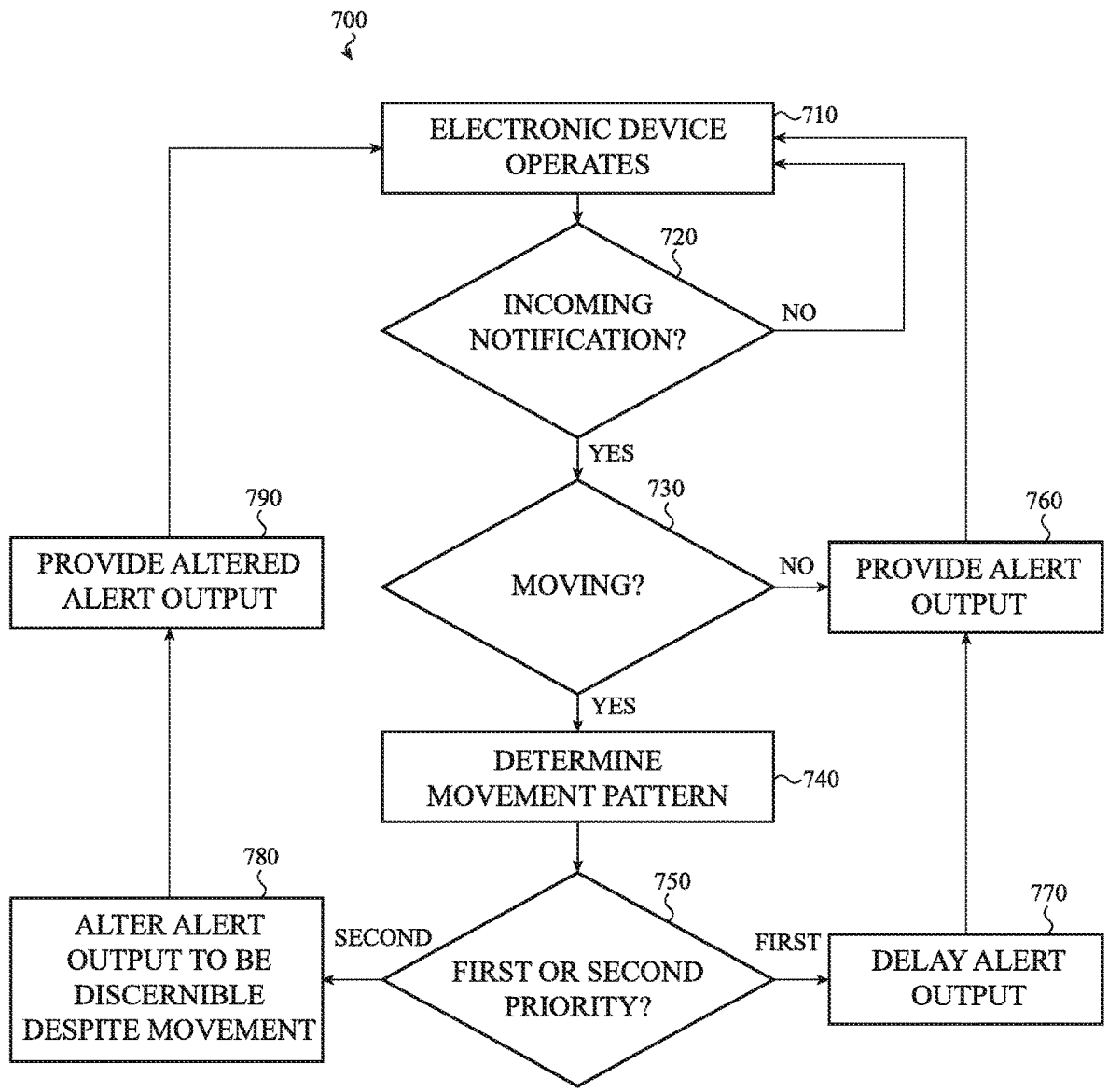
FIG. 7 is a flow chart illustrating a fifth example method for providing situationally-aware alert output. This fifth example method may be performed by the example system of FIGS. 1-2.

FIG. 7 is a flow chart illustrating a fifth example method 700 for providing situationally-aware alert output. This fifth example method 700 may be performed by the example system 100 of FIGS. 1-2.

The flow begins at block 710 where an electronic device operates. The flow then proceeds to block 720 where the electronic device determines whether or not an incoming notification or communication is received. If so, the flow proceeds to block 730. Otherwise, the flow returns to block 710 where the electronic device continues to operate.

At block 730, the electronic device determines whether or not the user is moving. If not, the flow proceeds to block 760 where the electronic device provides alert output (such as a vibration or other haptic output, audio output, visual output, and so on) before the flow returns to block 710 and the electronic device continues to operate. Otherwise, the flow proceeds to block 740.

At block 740, the electronic device determines a movement pattern of the user using the signals from the one or more sensors. Next, the flow proceeds to block 750 where the electronic device determines whether the incoming notification or communication is associated with a first priority or a second priority.

If the incoming notification or communication is associated with a first priority, the flow proceeds to block 770 where the electronic device delays the alert output. The flow then proceeds after the delay to block 760 where the electronic device provides the alert output.

If the incoming notification or communication is associated with a second priority, the flow proceeds to block 780 where the electronic device alters the alert output to be discernible despite the movement based on a cadence of the movement pattern. Next, the flow proceeds to block 790 where the electronic device provides the altered alert output. The flow then returns to block 710 where the electronic device continues to operate.

Although the example method 700 is illustrated and described as including particular operations performed in a particular order, it is understood that this is an example. In various implementations, various orders of the same, similar, and/or different operations may be performed without departing from the scope of the present disclosure.

For example, the example method 700 is illustrated and described as adjusting the alert output in a first way when the associated priority is a first priority and a second way when the associated priority is a second priority. However, it is understood that this is an example. In various implementations, the electronic device may adjust the alert output in a variety of different ways based on a variety of different associated priorities and/or based on other factors without departing from the scope of the present disclosure. By way of illustration, alert output may be continuously adjusted based on an associated continuous priority scale. Alternatively, the alert output may be provided to the user without adjustment.

Although the example methods 300-700 are illustrated and described separately, various operations described in the context of one or more of the example methods 300-700 may be used in one or more of the other example methods 300-700. For example, in some implementations, the example method 700 may include the operation of providing other output described at 490 of the example method 400. By way of another example, in various implementations, the example method 700 may include the operation of determining whether or not alert output was acknowledged described at block 580 of the example method 500.

Although the above describes adjusting alert output for individual alerts, delaying alert output for individual alerts, and/or otherwise handling alert output for individual alerts, it is understood that these are examples. In various implementations, output for alerts may be batched in various ways. For example, alerts associated with received high-priority communications may be individually output whereas those associated with received low-priority communications may be delayed before a single alert is output corresponding to a group of the low-priority communications. In some implementations of such an example, one or more rules may be applied (such as a user specified rule, a default rule, and so on) specifying how such batching is handled. By way of illustration, a rule may specify that a batch notification is provided no more than once per hour and alerts corresponding to received low-priority communications may be batched according to this rule. This batching may reduce the possibility of over-frequent alerts. Users may learn or train themselves to ignore over frequent alerts. Thus, reducing the number of alerts may increase salience of alerts.

As described above and illustrated in the accompanying figures, the present disclosure relates to an electronic device that provides situationally-aware alerts that adjusts alert output based on a user's situation in order to increase salience of the alert output when the user's situation merits increased salience. The electronic device may determine to provide an alert output, evaluate the user's situation based on information from one or more sensors, and increase salience by adjusting the alert output based on the user's situation.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device that provides situationally-aware alerts, comprising:
   a haptic output device;
   a sensor operable to produce a signal indicating information relating to movement of the electronic device; and
   a processing unit connected to the sensor and the haptic output device that:
   determines to provide a haptic output via the haptic output device;
   determines a movement pattern using the signal;
   determines that a pattern of the haptic output matches the movement pattern; and provides the haptic output after a delay to make the pattern of the haptic output mismatch the movement pattern.

2. The electronic device of claim 1, wherein:
the movement pattern indicates changes in elevation; and
the processing unit delays the haptic output until after the changes in elevation.

3. The electronic device of claim 2, wherein:
the sensor includes a pressure sensor;
the processing unit identifies the changes in elevation using the pressure sensor; and
the processing unit delays the haptic output until the processing unit determines, using the pressure sensor, that the changes in elevation have ceased.

4. The electronic device of claim 1, wherein the processing unit:
determines a first period, using the movement pattern, where the electronic device will be less proximate to a user;
determines a second period, using the movement pattern, where the electronic device will be more proximate to the user; and
delays the haptic output from the first period to the second period.

5. The electronic device of claim 1, wherein the processing unit delays the haptic output:
for a first period when the movement pattern indicates a first type of movement; and
for a second period when the movement pattern indicates a second type of movement.

6. The electronic device of claim 1, wherein:
the signal includes information indicating a heart rate of a user is elevated; and
the processing unit delays the haptic output until the heart rate of the user reduces.

7. The electronic device of claim 1, wherein the processing unit:
estimates a time when the haptic output will be salient despite the movement pattern; and
delays the haptic output until the time.

8. The electronic device of claim 1, wherein:
the movement pattern has a cadence; and
the processing unit uses a delay duration that causes the haptic output to mismatch the cadence.

9. The electronic device of claim 1, wherein the processing unit uses a delay duration that causes the haptic output to occur after the movement.

10. The electronic device of claim 1, wherein the processing unit uses a delay duration that causes the haptic output to occur during the movement.

11. The electronic device of claim 1, wherein the processing unit delays the haptic output by providing a different waveform.

12. The electronic device of claim 1, wherein the processing unit delays the haptic output by phase shifting a waveform.

13. The electronic device of claim 1, wherein the processing unit monitors the signal over a period of time in order to determine the movement pattern.

14. The electronic device of claim 1, wherein the movement pattern corresponds to the movement of the electronic device.

15. The electronic device of claim 1, wherein:
the processing unit provides the haptic output in response to an incoming message;
the haptic output is a first haptic output when the incoming message is associated with a first priority; and
the haptic output is a second haptic output when the incoming message is associated with a second priority.

16. The electronic device of claim 1, wherein:
the haptic output is a first haptic output; and
the processing unit provides a second haptic output upon determining that an acknowledgement to the first haptic output has not been received.

17. An electronic device that provides situationally-aware alerts, comprising:
a haptic output device;
a sensor operable to produce a signal indicating information relating to movement of the electronic device; and
a processing unit connected to the sensor and the haptic output device that:
determines to provide a haptic output via the haptic output device;
determines a movement pattern using the signal;
determines that a pattern of the haptic output matches the movement pattern; and
provides the haptic output after a delay determined using the movement pattern to make the pattern of the haptic output mismatch the movement pattern.

18. The electronic device of claim 17, wherein:
the haptic output has the pattern; and
the processing unit uses a delay duration that adjusts the pattern to be less similar to the movement pattern.

19. An electronic device that provides situationally-aware alerts, comprising:
a haptic output device;
a sensor operable to produce a signal indicating information relating to movement of the electronic device; and
a processing unit connected to the sensor and the haptic output device that:
determines to provide a haptic output via the haptic output device;
determines the movement using the signal;
determines that a pattern of the haptic output matches a pattern of the movement; and
provides the haptic output after a delay to make the pattern of the haptic output mismatch the pattern of the movement.

20. The electronic device of claim 19, wherein the processing unit provides the haptic output during at least a portion of the movement.

* * * * *